(12) United States Patent
Rapp

(10) Patent No.: US 6,325,379 B1
(45) Date of Patent: Dec. 4, 2001

(54) SHAFT ASSEMBLY HAVING IMPROVED SEAL

(75) Inventor: Robert J. Rapp, Simpsonville, SC (US)

(73) Assignee: Reliance Electric Technologies, LLC, Mayfield Heights, OH (US)

(*) Notice: Subject to any disclaimer, the term of this patent is extended or adjusted under 35 U.S.C. 154(b) by 0 days.

(21) Appl. No.: 09/186,922

(22) Filed: Nov. 6, 1998

(51) Int. Cl.$^7$ ..................................................... F16J 15/54
(52) U.S. Cl. ............................................................. 277/351
(58) Field of Search .................................. 277/350, 351, 277/353, 347

(56) References Cited

U.S. PATENT DOCUMENTS

| | | | |
|---|---|---|---|
| 2,003,000 | * | 5/1935 | Kelpe . |
| 2,571,352 | * | 10/1951 | Fast . |
| 3,325,175 | | 6/1967 | Lower . |
| 3,499,654 | | 3/1970 | Lower . |
| 3,810,636 | | 5/1974 | Gorski . |
| 3,934,953 | | 1/1976 | Tooley . |
| 3,942,849 | | 3/1976 | Doyle et al. . |
| 4,049,281 | | 9/1977 | Bainard . |
| 4,079,947 | * | 3/1978 | Morris . |
| 4,348,067 | | 9/1982 | Tooley . |
| 4,411,437 | | 10/1983 | Conti . |
| 4,575,265 | | 3/1986 | Tooley . |
| 4,580,789 | * | 4/1986 | Jett . |
| 4,592,666 | | 6/1986 | Jornhagen . |
| 4,632,404 | | 12/1986 | Feldle et al. . |
| 4,763,904 | | 8/1988 | Martinie . |
| 4,776,709 | | 10/1988 | Tooley . |
| 4,792,242 | | 12/1988 | Colanzi et al. . |
| 4,832,511 | | 5/1989 | Nisley et al. . |
| 4,863,292 | | 9/1989 | Dreschmann et al. . |
| 4,875,786 | | 10/1989 | DeWachter . |
| 4,906,111 | | 3/1990 | Martinie . |
| 4,943,068 | * | 7/1990 | Hatch et al. . |
| 5,011,301 | | 4/1991 | Martinie . |
| 5,022,659 | | 6/1991 | Otto . |
| 5,201,533 | | 4/1993 | Lederman . |
| 5,207,436 | | 5/1993 | Lederman . |
| 5,259,628 | | 11/1993 | Nisley . |
| 5,387,040 | | 2/1995 | Firestone et al. . |
| 5,489,156 | | 2/1996 | Martinie . |
| 5,529,403 | | 6/1996 | Martinie . |
| 5,536,090 | | 7/1996 | Nisley . |
| 5,690,471 | * | 11/1997 | Sasaki . |
| 5,704,719 | * | 1/1998 | Cook et al. . |
| 5,967,524 | * | 10/1999 | Fedorovich . |
| 5,996,542 | * | 12/1999 | Bathurst . |
| 6,050,571 | * | 4/2000 | Rieder et al. . |
| 6,059,292 | * | 5/2000 | Firestone . |

FOREIGN PATENT DOCUMENTS

| | | |
|---|---|---|
| 0051170 | 5/1982 | (EP) . |
| 0388258 | 9/1990 | (EP) . |
| 2631672 | 11/1989 | (FR) . |
| 2136891A | 9/1984 | (GB) . |

OTHER PUBLICATIONS

Catalog 4000 US, pp. 722, 723, 1991, United States.
Reliance Electric Company, 2 pages from catalog, 1996, United States.

* cited by examiner

Primary Examiner—Anthony Knight
Assistant Examiner—John L. Beres
(74) Attorney, Agent, or Firm—Lloyd Farr; Alexander M. Gerasimow; William R. Walbrun

(57) ABSTRACT

A shaft assembly includes a housing having a bore formed therein. A shaft is disposed rotatably in the housing and within the bore. A seal assembly extends between the shaft and a circumferential surface of the bore and includes a first annular seal member rotationally fixed to one of the shaft and the housing and extending therefrom to engage the other of the shaft and the housing. One or more annular seal members extend at least partially between the bore and the shaft to form a labyrinth between areas external and internal to the shaft assembly.

23 Claims, 7 Drawing Sheets

SHAFT ASSEMBLY HAVING IMPROVED SEAL

BACKGROUND OF THE INVENTION

Shaft assemblies such as motors and speed reducers generally include a housing in which a shaft is rotatably disposed. Motors generally include means for rotationally driving the shaft, which extends out of the housing through a bore. Speed reducers generally include a driven input shaft that rotationally drives one or more output shafts through gearing that controls the rotational speed of the output shaft(s). The input and output shafts extend into and out of the housing through respective bores.

Such assemblies often include a lip seal at the housing bore that extends between the housing and the shaft. The lip seal typically includes a rigid outer portion secured within the bore by an interference fit between the seal's outer circumferential surface and the bore's inner circumference. An elastomeric portion extends inward from the rigid outer portion to engage the shaft. This elastomeric lip bends axially inward toward the shaft assembly's interior, thus preventing the escape of lubricant from the interior area while providing an effective seal preventing entrance of exterior contaminants.

SUMMARY OF THE INVENTION

The present invention recognizes and addresses disadvantages of prior art construction and methods.

Accordingly, it is an object of the present invention to provide a shaft assembly having an improved seal structure.

It is a further object of preferred embodiments of the present invention to provide a shaft assembly having an improved seal structure wherein an elastomeric seal deflects axially inward to engage either the shaft or the housing bore inner circumference.

Some of these objects are achieved in certain preferred embodiments of the present invention by a shaft assembly comprising a housing having a bore formed therein. A shaft is disposed rotatably in the housing and within the bore. A seal assembly extends between the shaft and a circumferential surface of the bore. The seal assembly includes a first annular seal member rotationally fixed to one of the shaft and the housing and extends therefrom to engage the other of the shaft and the housing. A second annular seal member is rotationally fixed to the other of the shaft and the housing axially outward of the point at which the first member engages the other of the shaft and the housing. A third annular seal member is rotationally fixed to one of the shaft and the housing and extends therefrom to the second member.

In certain other preferred embodiments of the present invention, a shaft assembly includes a housing having a bore form therein. A shaft is disposed rotatably in the housing and within the bore. A seal assembly extends between the shaft and a circumferential surface of the bore and includes a first annular seal member having a rigid outer portion rotationally fixed to one of the shaft and the housing and an elastomeric inner portion engaging the other of the shaft and the housing. The inner portion deflects axially inward, with respect to the shaft, as it extends from the rigid outer portion to engage the other of the shaft and the housing. A second annular seal member is rotationally fixed to the other of the shaft and the housing axially outward of the point at which the elastomeric inner portion engages the other of the shaft and the housing and extends radially outward from the other of the shaft and the housing so that the second member covers the elastomeric inner portion.

The accompanying drawings, which are incorporated in and constitute a part of the specification, illustrate one or more embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended drawings, in which.

Figure 1:
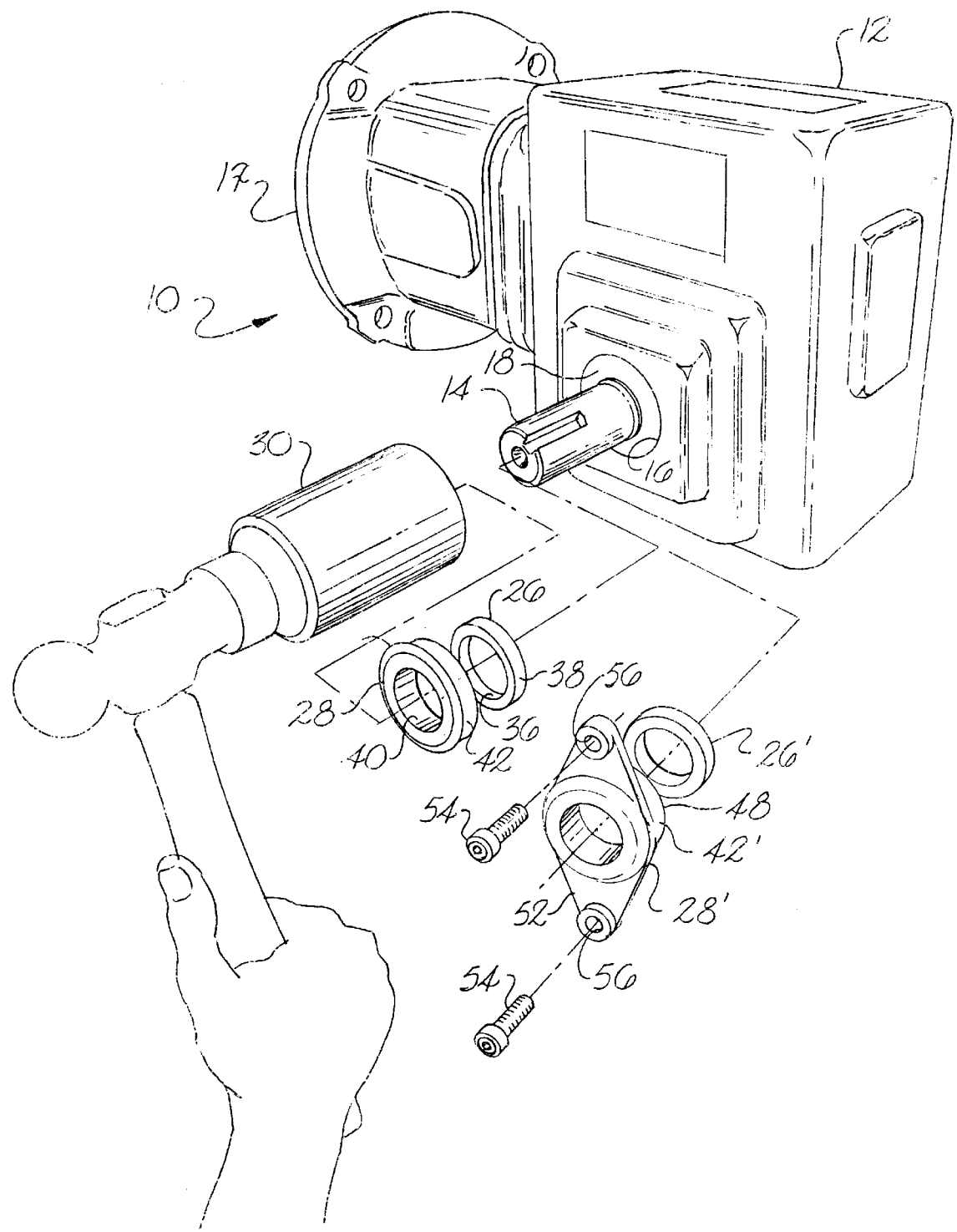
FIG. 1 is an exploded perspective view of preferred embodiment of a shaft assembly according to the present invention.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Referring to FIG. 1, a speed reducer 10 includes a housing 12 and an output shaft 14 extending through a bore 16 in the housing. The output shaft is driven by an input shaft surrounded by a bell portion 17 of housing 12. Although speed reducers are shown in the illustrated embodiments herein, it should be understood that this is for exemplary purposes only and that any suitable shaft assembly may be employed within the present invention.

Figure 2:
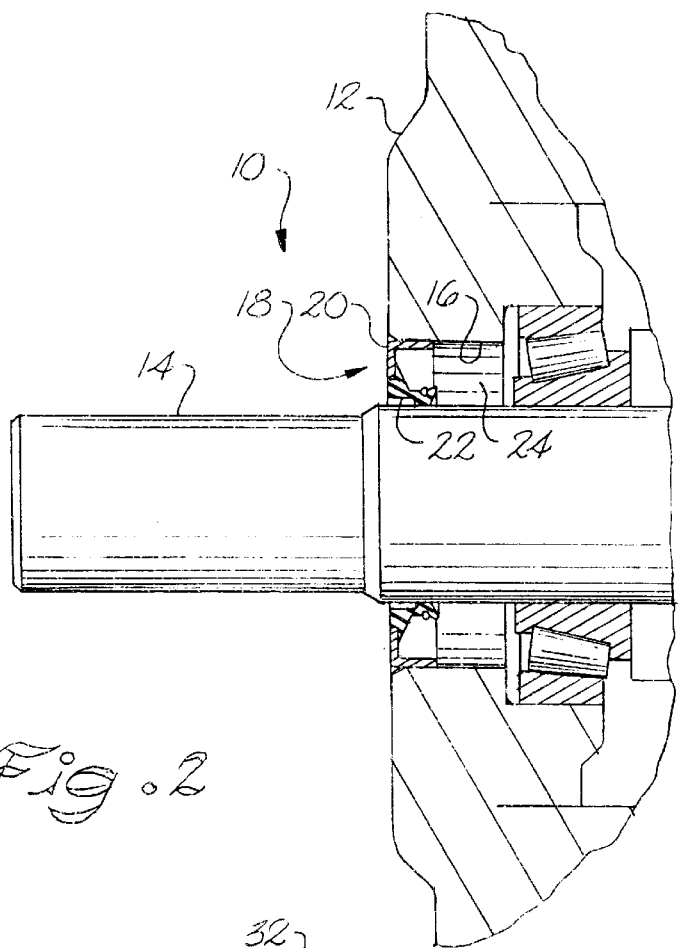
FIG. 2 is a partial cross-sectional view of a shaft assembly according to a preferred embodiment of the present invention.

An annular seal 18 extends between shaft 14 and the inner circumference of bore 16. Referring also to FIG. 2, the lip seal construction of seal 18 should be well understood by those skilled in this art. Seal 18 includes a rigid outer portion 20 secured to the inner circumference of bore 16 by an interference fit and an elastomeric portion 22 extending from rigid portion 20 to shaft 14. Rigid portion 20 may be formed from any suitable material, for example steel or hard polymer materials. Elastomeric portion 22 may be formed from any suitable elastomer material. Elastomeric portion 22 deflects axially inward, with respect to shaft 14, toward an interior area 24 of speed reducer 10 as portion 22 extends from rigid portion 20 to engage shaft 14. Thus, seal 18 is able to retain lubricant in area 24 while effectively preventing entrance of external contaminants.

Figure 3:
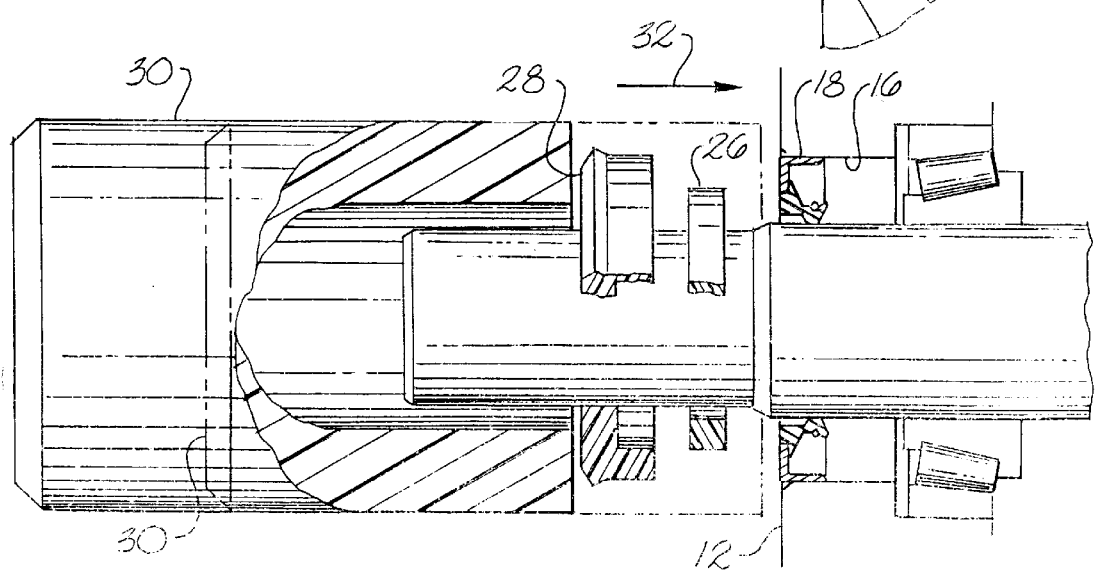
FIG. 3 is a partial cross-sectional view of the shaft assembly as in FIG. 2.
Figure 4:
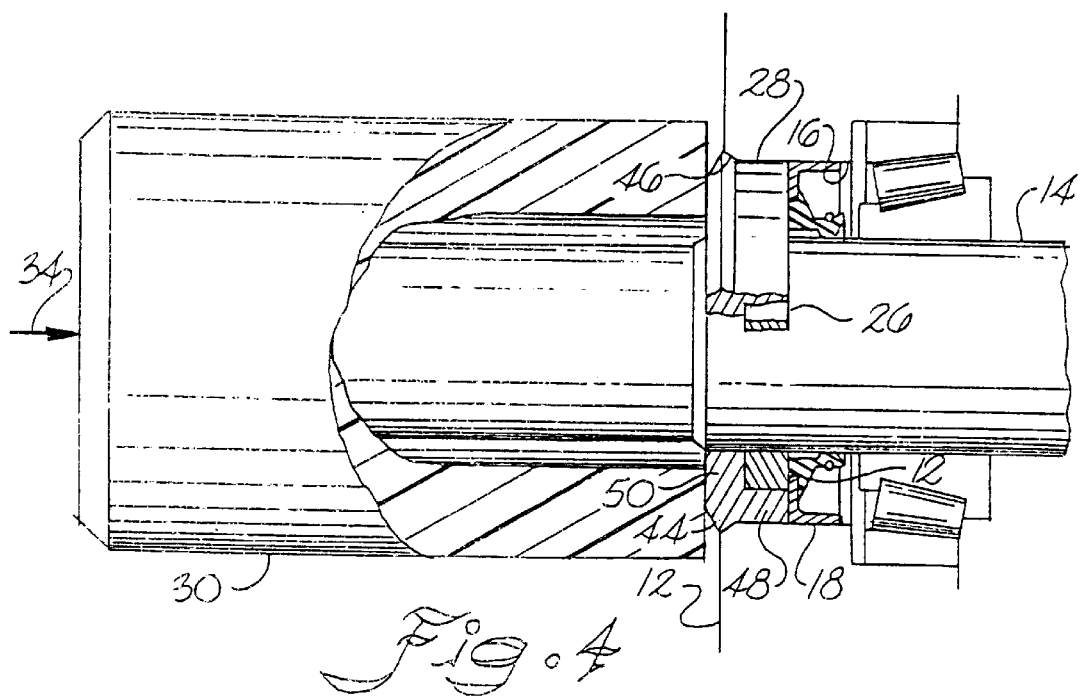
FIG. 4 is a partial cross-sectional view of the shaft assembly as in FIG. 2.

Referring to FIGS. 1 and 3, an auxiliary seal comprised of a second annular seal member 26 and a third annular seal member 28 is placed over shaft 14. A hollow tool 30 is then placed over shaft 14 and hammered axially inward, as indicated by arrow 32, to drive the second and third members into position as shown in FIG. 4. This drives seal 18 axially inward within bore 16 from its position shown in FIG. 2 to its position shown in FIG. 4.

An inner circumferential surface 36 of second member 26 establishes an interference fit with shaft 14, and second member 26 therefore rotates with the shaft. An outer circumferential surface 38, however, sufficiently clears an inner circumference 40 of third member 28 to allow relative rotation between the second and third members. An outer circumferential surface 42 of third member 28 forms an interference fit with the internal circumference of bore 16. An annular lip portion 44 of third member 28 abuts a radially extending edge 46 of bore 16.

Accordingly, referring specifically to FIG. 4, third member 28 and annular seal 18 are rotationally fixed to housing 12, while second member 26 is rotationally fixed to shaft 14. Third member 28 includes a first annular portion 48 extending between housing 12 and second member 26 and a second annular portion 50 extending from the housing to the shaft, thereby forming a groove that receives second member 26. Thus, the interfaces between second annular portion 50 and shaft 14, between third member 28 and second member 26, and between second member 26 and seal 18 form a labyrinth between the exterior area and the point at which elastomeric portion 22 engages the shaft. The labyrinth protects the flexible lip portion of seal 18 from dust and other debris and from direct contact with pressurized water used to clean the speed reducer.

Referring again to FIG. 1, third member 28 in a second embodiment includes a radially extending flange 52 so that the third member may be secured to housing 12 by bolts 54 that extend through holes 56 and threadedly engage tapped holes (not shown) in housing 12. In this embodiment, therefore, outer circumferential surface 42 of first annular portion 48 need not form an interference fit with the inner circumference of bore 16.

In a preferred embodiment, second member 26 and third member 28 are formed by a hard plastic material such as DELRIN.

It should be understood that the seal assembly formed by seal 18 and the auxiliary seal may be constructed in any suitable manner and that the embodiments illustrated in the Figures are provided for exemplary purpose only. Thus, for example, an elastomeric inner portion of seal 18, when present, need not deflect axially inward. Further, while in each three-part seal assembly shown herein, the first and third annular members are rotationally fixed to the housing, and the second member is rotationally fixed to the shaft, it should be understood that these arrangements may be reversed.

In certain embodiments, a lip seal such as shown in FIGS. 2–4 is fixed to the housing bore and extends radially inward to engage the shaft. A second annular member is rotationally fixed to the shaft axially outward of the elastomeric portion and extends radially outward from the shaft to cover the elastomeric portion. That is, in comparison to the embodiment shown in FIG. 4, third member 28 is omitted, and second member 26 may be extended radially outward.

Figure 5:
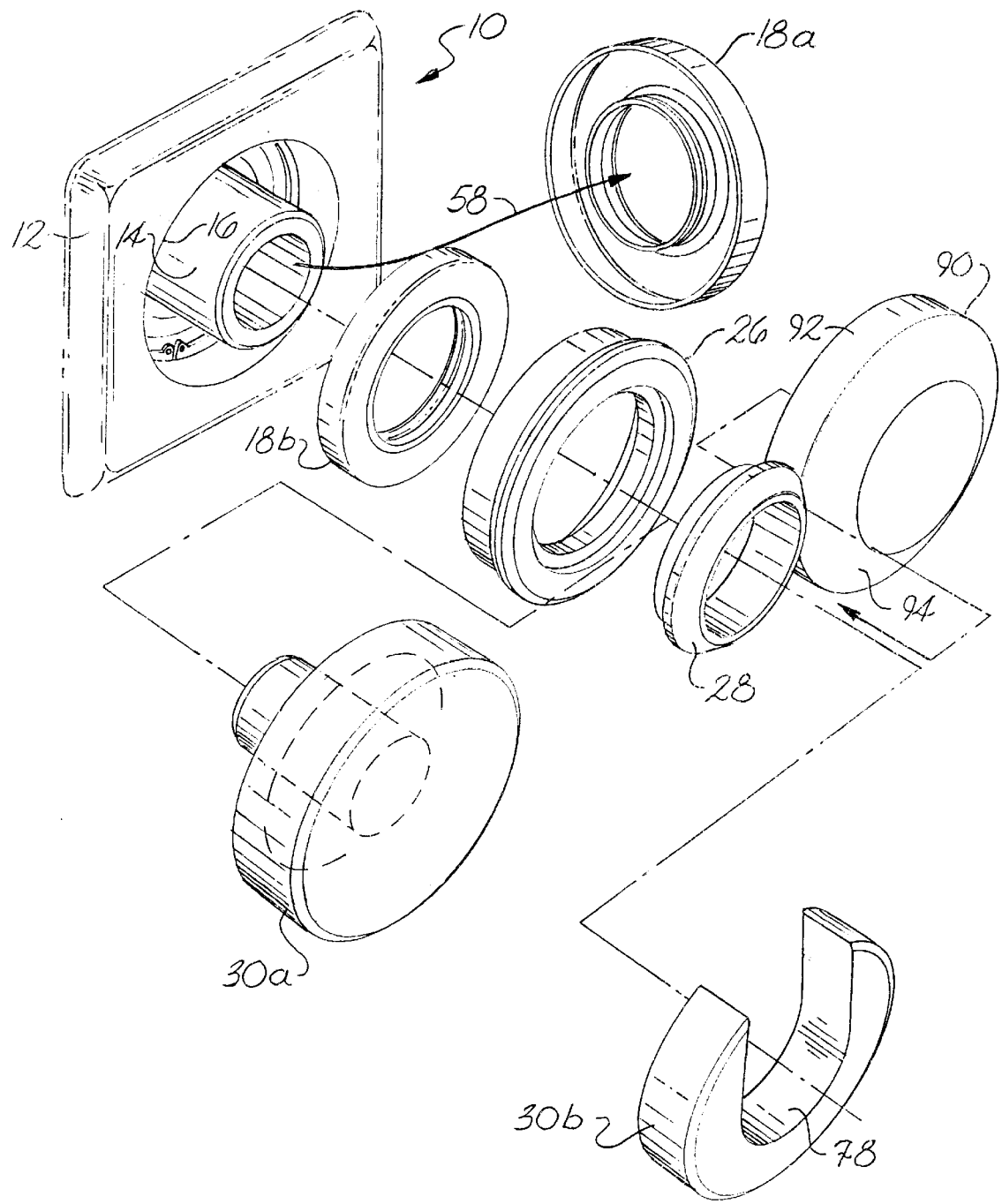
FIG. 5 is an exploded view of a shaft assembly according to a preferred embodiment of the present invention.
Figure 6:
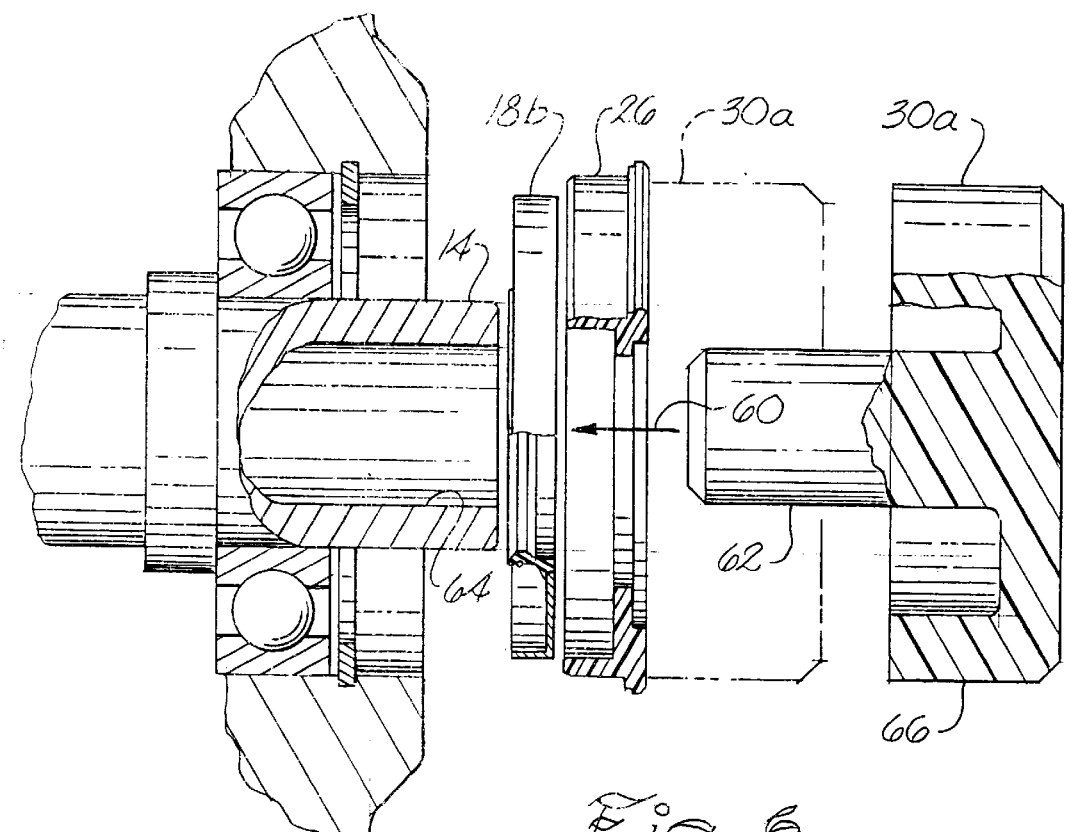
FIG. 6 is a partial cross-sectional view of the shaft assembly as in FIG. 5.
Figure 7:
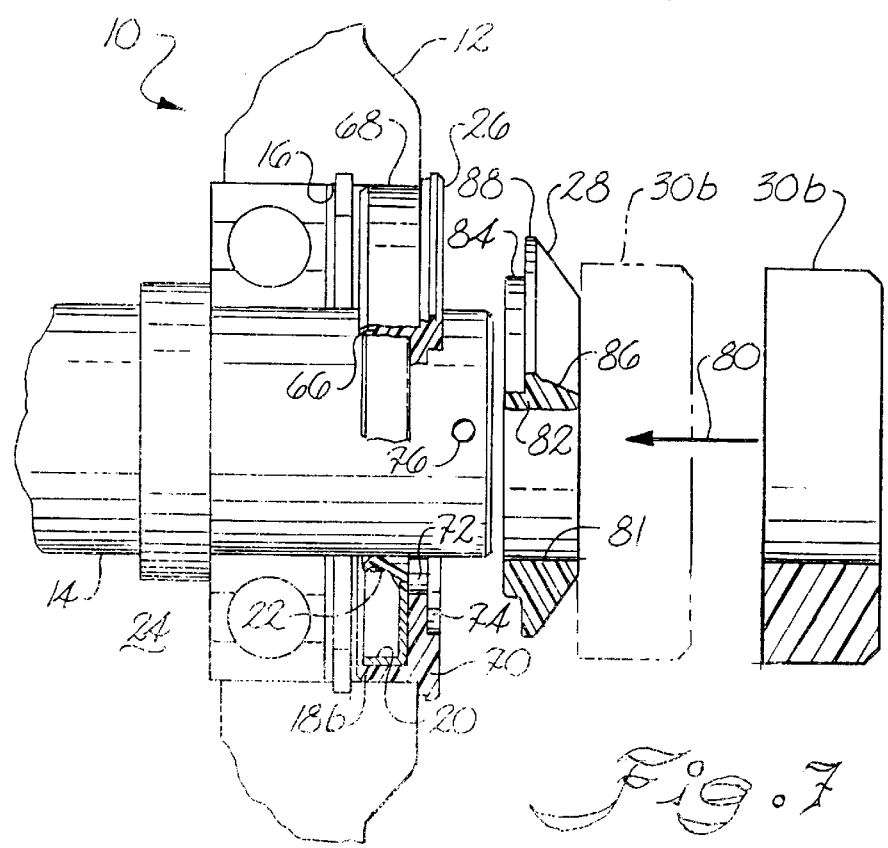
FIG. 7 is a partial cross-sectional view of the shaft assembly as in FIG. 5.

In another preferred embodiment of the present invention shown in FIG. 5, a speed reducer 10 includes a shaft 14 extending from a bore 16 of housing 12. As the present invention may be installed as a retrofit, an originally installed seal 18a is removed as indicated by arrow 58 and is replaced by a seal assembly comprising a first seal member 18b, a second seal member 26 and a third seal member 28. Referring also to FIGS. 6 and 7, lip seal 18b and second member 26 are placed on shaft 14 and tapped into position by a first tool 30a as indicated by arrow 60. Tool 30a includes a central stem portion 62 that is received within a central bore 64 of shaft 14 to center the tool. A cup-shaped outer portion 66 then abuts second member 26 as shown in phantom in FIG. 6. Hammer blows received at the back of tool 30a thus push lip seal 18b and second member 26 into position about shaft 14.

Referring also to FIG. 7, lip seal 18b includes a rigid outer portion 20 and an elastomeric inner portion 22 that deflects axially inward as it extends from the rigid outer portion to engage the shaft. Lubricant may be maintained in an interior area 24 defined axially inward of seal 18b.

Second member 26 includes a first annular portion 66 extending between housing 12 and outer portion 20 of lip seal 18b. Annular portion 66 defines an outer circumferential surface 68 received by bore 16 in an interference fit to rotationally fix second member 26 to the housing. The outer portion of the lip seal is, in turn, received by annular portion 66 in an interference fit. Thus, the lip seal may be pressed into annular portion 66 prior to mounting onto shaft 14 so that the lip seal and second member may be installed together. A second annular portion 70 of second member 26 defines a first inner circumferential surface 72 and a second inner circumferential surface 74 axially and radially outward of surface 72.

In the particular speed reducer 10 shown in FIGS. 5 and 7, a machine shaft (not shown) is inserted into the bore of shaft 14 and is secured by set screws 76. If third annular member 28 were to be placed on shaft 14 at the same time as seal 18b and second member 26, it would cover the set screws and prevent their tightening onto the machine shaft. Accordingly, following the placement of seal 18b and second member 26 on shaft 14, third member 28 is placed over the machine shaft, which is then inserted into the bore of shaft 14 and secured to shaft 14 by the set screws. An operator may then slide third member 28 up to second member 26 and drive it into position by a tool 30b. Tool 30b includes a cut out portion 78 to receive the machine shaft and/or shaft 14 so that the tool may be placed against third member 28 as indicated by arrow 80.

Figure 8:
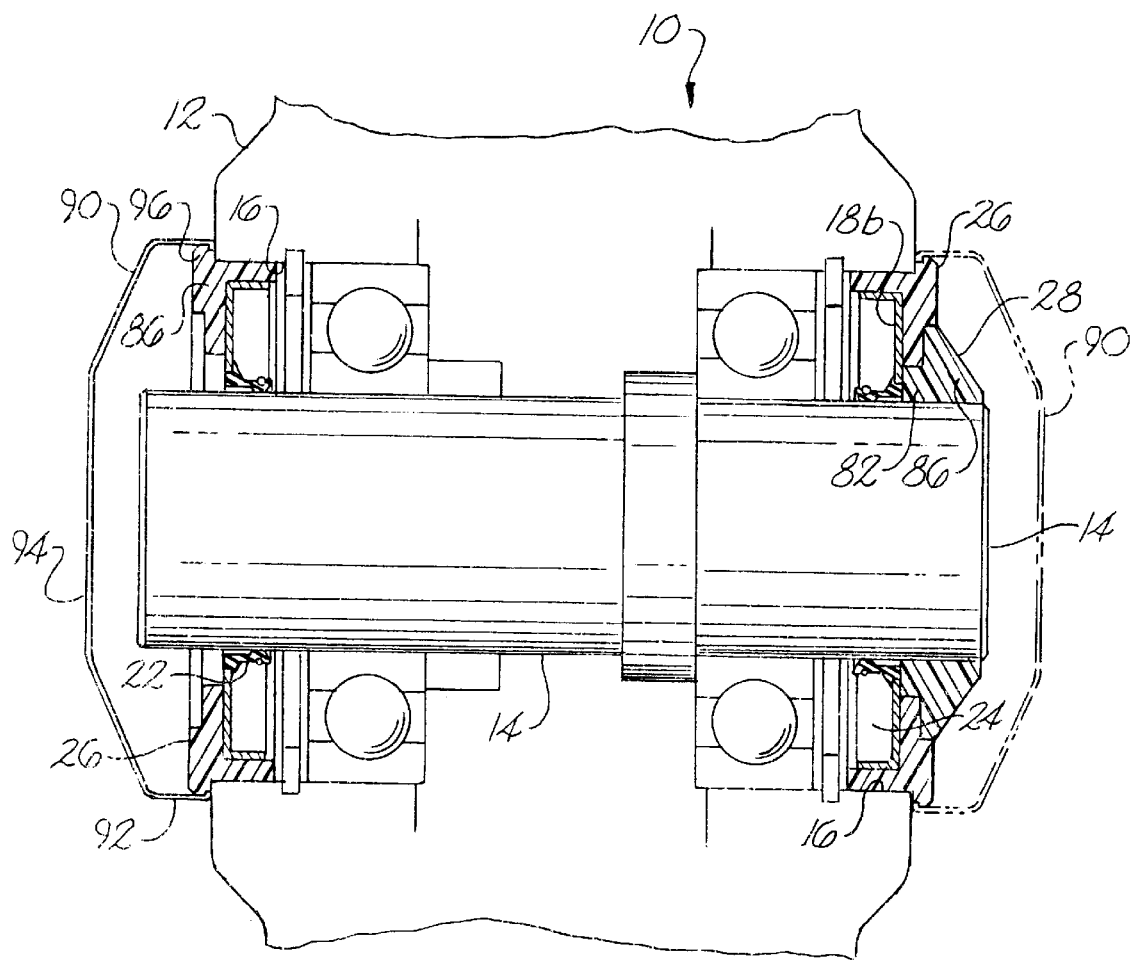
FIG. 8 is a partial cross-sectional view of a shaft assembly according to a preferred embodiment of the present invention.

Third member 28 rotates with shaft 14, while second member 26 and lip seal 18b are fixed to the housing. Third member 28 defines an inner circumference 81 that forms an interference fit with shaft 14 as member 28 is tapped onto the shaft by hammer blows to tool 30b. It also includes a first annular portion 82 defining an outer circumferential surface 84 and a second annular portion 86 defining an outer circumferential surface 88. Referring also to FIG. 8, as shown at the right hand side of gear reducer 10, first annular portion 82 is received within inner circumferential surface 72 of second member 26, and second annular portion 86 is received within surface 74. Thus, the second and third members form interengaging grooves, and a labyrinth is formed between second member 26 and third member 28 and between third member 28 and seal 18b from the exterior to the point at which seal 18b engages shaft 14.

Referring specifically to FIGS. 5 and 8, speed reducer 10 includes a central shaft 14 extending entirely though housing 12 so that the reducer may be positioned at a desired axial point on a machine shaft. That is, the speed reducer may be slidably moved on the machine shaft to properly position the speed reducer with respect to an input drive shaft (not shown). If, however, the machine shaft does not extend entirely through shaft 14, an end cap 90 may be used to cover bore 16 and the open end of shaft 14. Cap 90 includes an annular flange portion 92 surrounding a central portion 94. Flange 92 includes an inwardly curving edge that is received within a gap defined between housing 12 and an annular lip 96 of annular portion 86 of second member 26.

Thus, cap 90 is axially fixed to the housing through the engagement of opposing lips formed by the cap and the seal assembly. The opposing lips on the cap and seal need not be continuous. For example, the cap lip may comprise fingers received in spaced apart recesses in the housing or seal. The cap is preferably made from a flexible polymer material so that it may be removed.

As shown at the left hand side of FIG. 8, the third annular member 28 is not installed since the machine shaft is not attached at this end. Thus, cap 90 protects annular lip portion 22. Of course, provided there is no interfering machine shaft, cap 90 may be used to cover bore 16 even where third member 28 is present, as indicated in phantom at the right hand side of FIG. 8.

Figure 11:
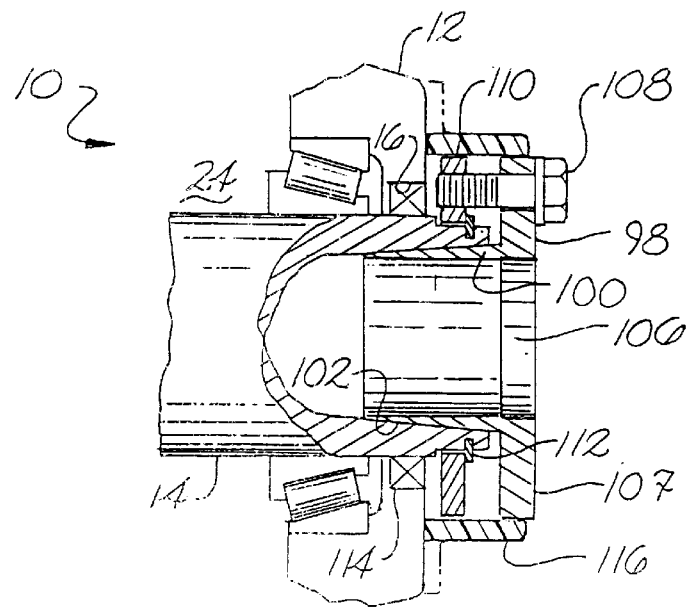
FIG. 11 is a partial cross-sectional view of the shaft assembly as in FIG. 9.
Figure 9:
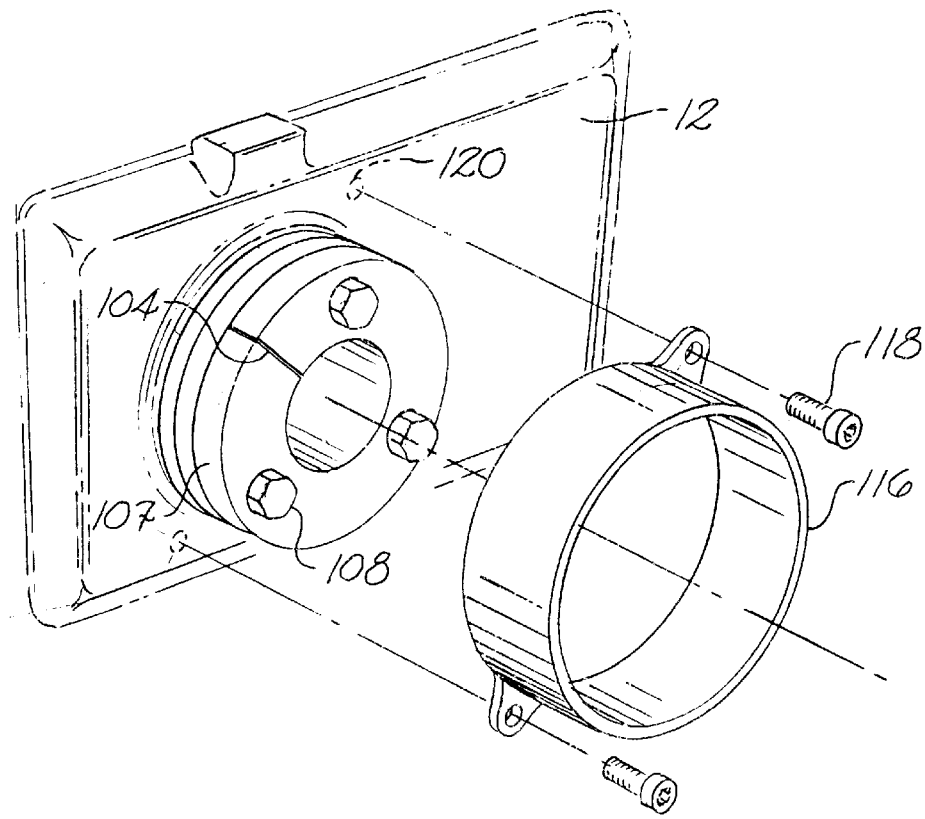
FIG. 9 is a partial exploded view of a shaft assembly according to a preferred embodiment of the present invention.
Figure 10:
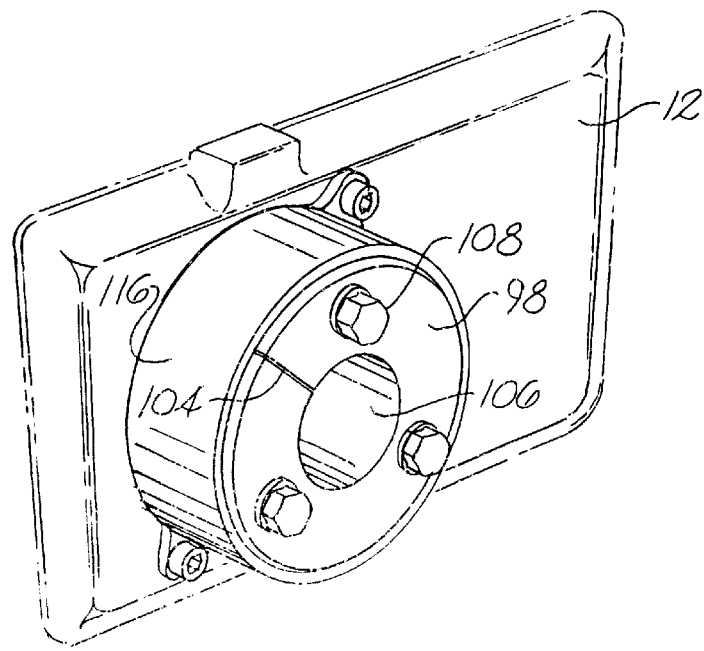
FIG. 10 is a partial perspective view of the shaft assembly as in FIG. 9.

Referring now to FIGS. 9, 10 and 11, a speed reducer 10 includes an output shaft 14 disposed in a housing 12. Depending on the reducer's design, one or two ends may be connected to a machine shaft. Speed reducers, such as illustrated in these and other figures herein, should be well understood in this art and are therefore not discussed in detail. It should be understood, however, that any suitable means for attaching the machine shaft to the output shaft may be used. In the example shown in FIGS. 9–11, the interior bore of shaft 14 is tapered, with the diameter expanding outward towards the shaft's end. An attachment collar 98 includes a central section 100 received in the shaft bore and having an outer circumferential surface 102 defining a taper that corresponds to the shaft taper. Collar 98 defines a radial cut 104 so that compression of the collar reduces the diameter of the collar's central bore 106. Thus, when the center portion of collar 98 is pushed axially into the shaft bore, the diameter of bore 106 is reduced as the outer tapered surface 102 of collar 98 slides down against the inner tapered surface of shaft 14, thus securing a machine shaft (not shown) to shaft 14. Collar 98 is rotationally fixed to shaft 14 by friction or other means.

Collar 98 includes an annular flange 107 having holes through which three bolts 108 extend. Bolts 108 threadedly engage holes in a ring 110 axially retained on shaft 14 by a clip 112. As bolts 108 are tightened into ring 110, collar 98 is pulled axially inward into shaft 14, thus tightening the collar onto the machine shaft.

An annular seal 114, for example made of an elastomeric material, is rotationally fixed to housing 12 in bore 16 and retains lubricant within interior area 24 of gear reducer 10. To provide auxiliary protection, an annular ring 116 is received about ring 110 and flange 107. Ring 116 is attached to housing 12 by screws 118 received in threaded holes 120 tapped into housing 12. Ring 116 may be made, for example, from a metal or a hard polymer material such as DELRIN. Although ring 116 is attached to the housing block axially and radially outward of bore 16, it may also be considered an extension of the bore from the block so that flange 107 and ring 110 form annular members creating a labyrinth between the exterior area and seal 114.

While one or more preferred embodiments of the invention have been described above, it should be understood that any and all equivalent realizations of the present invention are included within the scope and spirit thereof. For example, the present invention may be embodied in a variety of shaft assemblies in which a rotatable shaft is disposed in a housing and within a bore in the housing extending between the exterior area and an interior area. Thus, the present invention is not limited to motors and speed reducers, and the embodiments depicted are presented by way of example only and are not intended as limitations upon the present invention. Thus, it should be understood by those of ordinary skill in this art that the present invention is not limited to these embodiments since modifications can be made. Therefore, it is contemplated that any and all such embodiments are included in the present invention as may fall within the literal or equivalent scope of the appended claims.

What is claimed is:

1. A shaft assembly, said assembly comprising:
   a housing having a bore formed therein;
   a shaft disposed rotatably in said housing and within said bore; and
   a seal assembly extending between said shaft and a cylindrical circumferential surface of said bore, said seal assembly including
      a first annular seal member slidably received within said bore and rotationally fixed to one of said shaft and said circumferential surface and extending therefrom to engage the other of said shaft and said circumferential surface,
      a second annular seal member slidably received within said bore separately from said first member and rotationally fixed to said other of said shaft and said circumferential surface axially outward of the point at which said first member engages said other of said shaft and said circumferential surface, and
      a third annular seal member slidably received within said bore separately from said first member and said second member and rotationally fixed to said one of said shaft and said circumferential surface and extending therefrom to said second member.

2. The assembly as in claim 1, wherein at least one of said second member and said third member defines an annular groove receiving the other of said second member and said third member to form a labyrinth at least partially defined between said second member and said third member at said groove.

3. The assembly as in claim 2, wherein said first member is a lip seal having a rigid outer portion rotationally fixed to said circumferential surface and an elastomeric inner portion engaging said shaft.

4. The assembly as in claim 3, wherein said elastomeric inner portion deflects axially inward, with respect to said shaft, as it extends from said rigid outer portion to engage said shaft.

5. The assembly as in claim 1, wherein said first member and said third member are rotationally fixed to said circumferential surface and said second member is rotationally fixed to said shaft.

6. The assembly as in claim 5, wherein said third member includes a radially extending flange attached to an outer surface of said housing.

7. The assembly as in claim 5, wherein said third member includes an annular lip extending radially outward against an axially outward edge of said bore.

8. The assembly as in claim 1, wherein said first member is rotationally fixed to said one of said shaft and said housing through said third member.

9. The assembly as in claim 8, wherein said third member includes an annular flange rotationally fixed to said one of said shaft and said housing and wherein said first member is rotationally fixed to a circumferential surface of said flange by an interference fit.

10. The assembly as in claim 2, wherein said third member defines a said groove and extends from said one of said shaft and said circumferential surface to said other of said shaft and said circumferential surface so that said second member is disposed axially between said first member and said third member.

11. The assembly as in claim 2, wherein said third member and said second member define interengaging said grooves.

12. The assembly as in claim 5, wherein said third member defines a first inner circumferential surface and a second inner circumferential surface radially and axially outward of said first inner circumferential surface, and wherein said second member includes a first annular portion extending between said shaft and said first inner circumferential surface and a second annular portion extending between said shaft and said second inner circumferential surface.

13. The assembly as in claim 1, including
a first annular lip axially fixed to said housing radially outward of and about said bore, and
a cap having a second annular lip surrounding a central portion, said second annular lip mating with said first annular lip to axially fix said cap to said housing so that said central portion covers said bore and an end of said shaft.

14. The assembly as in claim 13, wherein said first member and said third member are rotationally fixed to said housing, and wherein said third member includes said first annular lip extending radially outward against an axially outward edge of said bore and forming a gap between said lip and an outer surface of said housing into which said second annular lip is received.

15. The assembly as in claim 1, wherein said first seal member and said third seal member are rotationally fixed to said one of said shaft and said circumferential surface in an interference fit and said second member is rotationally fixed to said other of said shaft and said circumferential surface in an interference fit.

16. A speed reducer, said speed reducer comprising:
a housing having a bore formed therein;
a shaft disposed rotatably in said housing and within said bore; and
a seal assembly extending between said shaft and a circumferential surface of said bore, said seal assembly including
a first annular seal member having a rigid outer portion rotationally fixed to said housing and an elastomeric inner portion engaging said shaft, said elastomeric inner portion deflecting axially inward, with respect to said shaft, as it extends from said rigid outer portion to engage said shaft,
a second annular seal member rotationally fixed to said shaft axially outward of the point at which said elastomeric inner portion engages said shaft, and
a third annular seal member rotationally fixed to said housing and including a first annular portion having an inner circumferential surface receiving said rigid outer portion of said first member to rotationally fix said first member to said housing,
wherein said third member also includes a second annular portion axially outward of said first member and extending to said second member, said second and said third members defining interengaging grooves to form a labyrinth at least partially defined between said second member and said third member at said grooves.

17. The speed reducer as in claim 16, wherein said second annular portion of said third member defines a first inner circumferential surface and a second inner circumferential surface radially and axially outward of said first circumferential surface, and wherein said second member includes a first annular portion extending between said shaft and said first circumferential surface and a second annular portion extending between said shaft and said second circumferential surface.

18. A speed reducer, said speed reducer comprising:
a housing having a bore formed therein;
a shaft disposed rotatably in said housing and within said bore; and
a seal assembly extending between said shaft and a circumferential surface of said bore, said seal assembly including
a first annular seal member having a rigid outer portion rotationally fixed to said housing and an elastomeric inner portion engaging said shaft, said elastomeric inner portion deflecting axially inward, with respect to said shaft, as it extends from said rigid outer portion to engage said shaft,
a second annular seal member rotationally fixed to said shaft axially outward of the point at which said elastomeric inner portion engages said shaft, and
a third annular seal member including a first annular portion axially outward of said rigid outer portion and extending from said circumferential surface to said second member,
wherein said third member also includes a second annular portion axially outward of said first annular portion and said second member and extending to said shaft.

19. A seal assembly for use between a shaft and a bore formed by a housing in which the shaft is rotatably disposed, said assembly comprising:
a first annular seal member configured to be slidably received within a cylindrical circumferential surface of said bore and rotationally fixed to one of said shaft and said circumferential surface and so that said first member extends radially therefrom to engage the other of said shaft and said circumferential surface;
a second annular seal member configured to be slidably received within said cylindrical circumferential surface separately from said first member and rotationally fixed to one of said shaft and said circumferential surface axially outward of the point at which said first member engages said other of said shaft and said circumferential surface; and a third annular seal member configured to be slidably received within said cylindrical circumferential surface separately from said fist member and said second member and rotationally fixed to one of said shaft and said circumferential surface so that said third member is disposed axially outward of said second annular seal member so that a labyrinth is formed by said second member and said third member.

20. A seal assembly for use between a shaft and a bore formed by a housing in which the shaft is rotatably disposed, said assembly comprising:

a first annular seal member configured to be slidably received within a cylindrical circumferential surface of said bore;

a second annular seal member coaxial with said first member and configured to be slidably received within said circumferential surface separately from said first member; and a third annular seal member coaxial with said first and second members, configured to be slidably received within said circumferential surface separately from said first member and said second member, and defining an annular groove receiving said second member so that said second member and said third member are rotatable with respect to each other and so that a labyrinth is formed between said second member and said third member.

21. The assembly as in claim 20, wherein said first member includes a rigid portion and an elastomeric portion.

22. The assembly as in claim 21, wherein said elastomeric portion deflects axially away from said second and third members as said elastomeric portion extends radially from said rigid portion.

23. The assembly as in claim 20, wherein said second member defines an annular groove receiving said third member so that said groove in said second member interengages with said groove of said third member.

* * * * *